(12) United States Patent
    Gross

(10) Patent No.: US 11,805,843 B2
(45) Date of Patent: Nov. 7, 2023

(54) MIDSOLE OF A SHOE

(71) Applicant: Alexander Louis Gross, Aspen, CO (US)

(72) Inventor: Alexander Louis Gross, Aspen, CO (US)

( * ) Notice: Subject to any disclaimer, the term of this patent is extended or adjusted under 35 U.S.C. 154(b) by 183 days.

(21) Appl. No.: 17/195,295

(22) Filed: Mar. 8, 2021

(65) Prior Publication Data
US 2021/0186151 A1    Jun. 24, 2021

Related U.S. Application Data

(60) Provisional application No. 63/100,264, filed on Mar. 6, 2020.

(51) Int. Cl.
| | |
|---|---|
| *A43B 13/14* | (2006.01) |
| *A43B 13/04* | (2006.01) |
| *A43B 13/18* | (2006.01) |
| *A43B 13/12* | (2006.01) |
| *A43B 5/06* | (2022.01) |
| *B32B 3/26* | (2006.01) |
| *B32B 27/08* | (2006.01) |
| *F16F 7/12* | (2006.01) |
| *B32B 3/12* | (2006.01) |
| *B32B 3/02* | (2006.01) |

(52) U.S. Cl.
CPC ............ *A43B 13/141* (2013.01); *A43B 13/04* (2013.01); *A43B 13/125* (2013.01); *A43B 13/146* (2013.01); *A43B 13/181* (2013.01); *A43B 13/187* (2013.01); *B32B 3/12* (2013.01); *B32B 3/26* (2013.01); *B32B 27/08* (2013.01); *F16F 7/121* (2013.01); *A43B 5/06* (2013.01); *B32B 2307/56* (2013.01); *B32B 2437/02* (2013.01)

(58) Field of Classification Search
CPC ..... A43B 1/0009; A43B 1/0018; A43B 13/12; A43B 13/141; B32B 3/12
See application file for complete search history.

(56) References Cited

U.S. PATENT DOCUMENTS

| | | | | |
|---|---|---|---|---|
| 2,477,852 | A * | 8/1949 | Bacon | E04C 2/36 428/116 |
| 4,535,553 | A * | 8/1985 | Derderian | A43B 13/181 36/28 |
| 11,229,254 | B1 * | 1/2022 | Matteucci | A42B 3/20 |

(Continued)

FOREIGN PATENT DOCUMENTS

WO   WO-2017196899 A1 * 11/2017 ........... A43B 1/0009

*Primary Examiner* — Clinton T Ostrup
*Assistant Examiner* — Akwokwo Olabisi Redhead
(74) *Attorney, Agent, or Firm* — Barry Choobin; Patent 360

(57) ABSTRACT

An athletic footwear with improved midsole that is having a helical network. The helical network can morph itself under compressive force. The helical network is made from units of an hourglass shape geometry, each unit having an upper member and a lower member. Each unit is of a wireframe geometry that is integrated with adjacent units to form a networked layer. When an external pressure is applied to the networked layer, such as when the feet wearing the footwear land on a ground, the wireframe legs in the upper member and lower member twists for providing cushioning and resiliency.

11 Claims, 10 Drawing Sheets

(56) References Cited

U.S. PATENT DOCUMENTS

| | | | | |
|---|---|---|---|---|
| 2010/0258988 A1* | 10/2010 | Darnell | ............... | F16F 3/0876 |
| | | | | 267/141 |
| 2014/0007322 A1* | 1/2014 | Marz | ..................... | F41H 1/04 |
| | | | | 428/156 |
| 2014/0259787 A1* | 9/2014 | Guyan | ................ | A43B 13/14 |
| | | | | 36/103 |
| 2018/0271213 A1* | 9/2018 | Perrault | ................ | A43D 1/02 |
| 2019/0069631 A1* | 3/2019 | Mitchell | ............... | B32B 27/40 |

* cited by examiner

MIDSOLE OF A SHOE

CROSS-REFERENCE TO RELATED APPLICATIONS

This application claims priority to the U.S. provisional patent application Ser. No. 63/100,264, filed on Mar. 6, 2020, which is incorporated herein by reference in its entirety.

FIELD OF INVENTION

The present invention relates to footwear, and more particularly, the present invention relates to a midsole of an athletic footwear.

BACKGROUND

Cushioning is important in shoes for absorbing landing shocks and supporting the feet. Cushioning adds capacity to the shoes to absorb the impact of the foot landing on the ground. Proper cushioning is important in athletic shoes, particularly in running shoes to relieve the strain on the body every time the feet come in contact with the ground. Cushioning in the shoes is generally provided by using a shock absorption material in the midsole of the shoes. For example, shock-absorbing foam is generally used in the midsoles for absorbing the impact of the feet landing on the ground.

However, the known shock-absorbing materials gradually degenerate in efficiency with usage, thus lacking durability. Users have to frequently replace their shoes which increases the cost. Moreover, a user may be unaware of the state of their shoes and continue to use them, which can be risky and may cause injury to the wearer. Experienced runners often purchase two pairs of shoes at a time so that they can compare how much cushioning remains in the first pair by comparing it to the second pair. Besides the durability of the available shock-absorbing material, there is a constant desire to decrease the weight of the shoes which further exaggerates the problem. The industry that used to consider 1000 miles of usage for a running shoe as the normal, had reduced the usage down to 700 miles, then to 600 miles, and now to 500 miles although most companies know that 350-400 miles is closer to the truth.

Some attempted solutions in the art have involved the use of encapsulated pressurized inert gases, encapsulated gels, bellows componentry, blow molded midsoles, and a variety of polymer foam technologies that continue in use even today. These efforts have often resulted in awkward (mechanical solutions) and often fragile (new foams) non-solutions to the issue. These efforts have usually resulted in drastic increases in cost to the consumer. Another realization that has come to the industry in just the last year or two, this being that running performance as defined by less use of oxygen for a given run is directly affected by the softness and springiness of the shoe, i.e., the midsole. This is independent of the level of Peak G as measured in the biomechanics laboratory.

The prior art discloses various improvements in the cushioning of the shoes. For example, a U.S. Pat. No. 8,726,424 B2 describes a midsole consisting of pairs of concentric tubes for cushioning instead of foams. Non-footwear applications are also touted. Another U.S. Pat. No. 10,470,520 B2 describes a full-length midsole network of laths. Another U.S. Patent Application Publication No. US 2004/0128860 A1 describes a system of columnar elements for changing the characteristics of footwear. Another U.S. Patent No. 20070039204 A1 describes a midsole employing several pillars with an outer layer and an inner layer of cushioning material. Another U.S. Pat. No. 10,034,516 B2 describes a sole structure employing two interconnected impact-attenuating elements. Another U.S. Pat. No. 4,535,553 describes a midsole made of foam with a structure inside of the foam-forming a composite. Another U.S. Pat. No. 6,314,664 B1 describes a corrugated piece of plastic called the "Wave" encased in EVA foam. Another U.S. Pat. No. 4,815,221 A describes an energy control system with a leaf spring embedded in a casing of EVA foam. However, the known solution suffers from the same aforesaid drawbacks i.e., lacking the combination of softness and durability.

Known shock absorbing material requires a larger time to manufacture which increases the cost. technologies. Many methods exist for producing midsoles but all of them have various flaws including very slow production speed, Very high prices, No flexibility in available material choices (only a couple are now available), Poor physical properties in the Z axis direction, Parts often cannot be designed as desired due to several process limitations, Deposable support structures for many of the processes, Many structures need to consist of mostly vertical (and not branched) elements which result in nearly a 75% increase in weight and much poorer performance in terms of cushioning and resilience, the tolerances are too high for accurate microstructures, the minimum thickness is usually 2+ mm which is also very high for midsole microstructures, the build platforms are often too small to accommodate larger sizes, more advanced support materials are also needed for larger spans for larger parts, even the powder processes have issues with density defects, rapid cooling stress, powder entrapment, and laser beam spot size.

Therefore, a desire is there for improved cushioning in athletic shoes that overcomes the drawbacks of the prior art. A need is there for an elegant, streamlined, sturdy, and lightweight solution that directly addresses the needs of both industry and consumer in this regard. A desire is there for footwear that overcomes the above drawbacks.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to improved cushioning for footwear that is durable and has an enhanced resilience level.

It is another object of the present invention to provide midsoles for footwear with improved cushioning and durability.

It is still another object of the present invention that footwear provides improved athletic performance.

It is yet another object of the present invention that footwear is soft in the feet.

It is a further object of the present invention that the footwear combines softness and durability.

It is an additional object of the present invention that the footwear is an elegant, streamlined, sturdy, and lightweight solution which directly addresses the needs of both industry and consumer in this regard.

In one aspect disclosed is a midsole for footwear having network of interconnected hourglass shape units. Each unit in the network has an upper hexagonal frustum and a lower hexagonal frustum. The upper hexagonal frustum has a broad top and a narrow base. Similarly, the lower hexagonal frustum has a broad top and a narrow base. The narrow base of the upper hexagonal frustum and the marrow base of the lower hexagonal frustum are integral forming a neck of the unit. In one case, the neck is round, and the top of the hexagonal frustum has six sides.

In one aspect, the top of each of the upper hexagonal frustum and the lower hexagonal frustum has six sides, wherein each unit is connected to the other six units to form a continuous network layer. Spatially adjacent opposite sides of the upper hexagonal frustum and the lower hexagonal frustum can be integrated with the Spatially adjacent opposite sides of the upper hexagonal frustum and the lower hexagonal frustum of the other unit.

In one aspect, each of the upper hexagonal frustum and the lower hexagonal frustum have semi-rigid and resilient six legs that extends from the narrow base to the broad top forming the hexagonal frustum. The six legs under external force on the top of the frustum twist helically for absorption of the impact.

In one aspect, disclosed is a midsole for an athletic shoe having one or more network layers one over another.

In one aspect, disclosed is footwear having the disclosed midsole, wherein the footwear can be a sports shoe or an athletic shoe.

In one aspect, the highly resilient structural midsole network can be manufactured using Selective Laser Sintering (SLS) using powdered plastic resin; Stereo Lithography (SLA) using liquefied plastic resin; Multi Jet Fusion (MJF) using powered plastic resin, Free Form using injection moldable solid plastic pellets, and Injection molding using solid plastic pellets. Each network layer can be formed as an integral piece. Alternatively, the network layer can be formed in two separate layers, one having the upper hexagonal frustum and another having the lower hexagonal frustum. The two sub-layers can be bonded to form the network layer of units.

In one aspect, disclosed is a midsole for footwear having a lattice structure network of integral hourglass shape units arranged side-by-side. Each unit in the lattice structure has an upper member of a hexagonal frustum shape and a lower member of the hexagonal frustum. The lower member can be the same as the upper member but inverted. Alternatively, the lower member can be different from the upper member. The upper member has a broad hexagonal top and a narrow base. Similarly, the lower member has a broad hexagonal bottom and a narrow top. The narrow base of the upper member and the narrow top of the lower member are integral to form the neck of the hourglass shape unit. In one case, the neck is round. The unit can be a wireframe geometry.

In one aspect, each of the hexagonal top of the upper member and the hexagonal bottom of the lower member has six sides, wherein each unit is connected to the other six units to form a continuous integral lattice structure. Spatially adjacent opposite sides of the upper member and the lower member of one unit can be integrated with the spatially adjacent opposite sides of the upper member and the lower member of an adjacent unit.

In one aspect, each of the upper member and the lower member has resilient six legs forming the hexagonal frustum. The six legs under external compression force helically twist for the absorption of the external force.

In one aspect, the six legs of the upper member are arranged offset relative to the six legs of the lower member. The legs of the upper member twist in a direction opposite to the legs of the lower member.

In one aspect, disclosed is a midsole for an athletic shoe having one or more layers of the lattice structure sandwiched between the load distribution plates.

In one aspect, the lattice structure is enveloped in a gel matrix, wherein the gel matrix provides additional shock absorption.

In one aspect, the lattice structure can be enveloped by a rim for preventing any ingress of dust, grid, pebbles, and the like.

In one aspect, the lattice structure has an integrated network of hourglass shape units. The midsole can be manufactured in two layers of the upper member and the lower member, the two layers can be bonded.

In one aspect, each leg has a midpoint dividing the leg into two parts, two parts having different bend angles. The legs can be curved in geometry. Under an external compression force, the legs bulge outwards slightly to absorb the initial impact and thereafter helically twist till the unit is collapsed. The offset arrangement of the legs in the upper member and the lower member and the offset arrangement of the legs in the adjacent unit permits resiliency and quick regain of shape by the units.

In one aspect, the legs are made of resilient thermoplastic polymers. The diameter of each leg in the wireframe structure can be between 0.75-1.90 mm.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
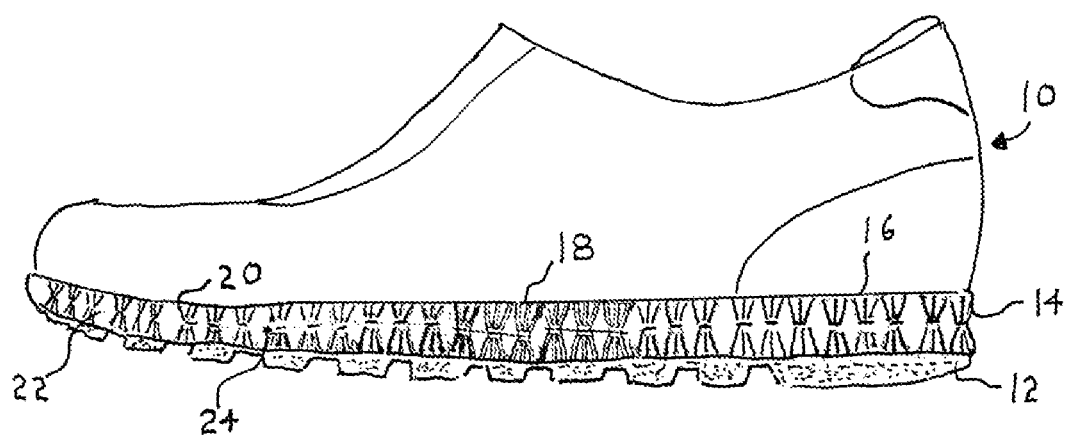
FIG. 1 is a side elevational view of an athletic shoe with the upper 10, outsole 12, and a shock absorbing midsole layer 14, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a footwear having a combination of enhanced comfort and durability. Also disclosed is an athletic footwear that has enhanced cushioning that is soft, comfortable, and durable. Specifically, disclosed is a midsole of sports footwear, such as running shoes that are both soft and durable. The disclosed midsole for sports footwear can efficiently absorb the impact of the feet landing on the ground without significant strain on the body. The disclosed footwear feels soft on the feet and the resiliency is long lasting. The disclosed midsole consists of a highly resilient cushioning lattice structure that is capable of completely folding into itself into a minimally thick base layer under static or dynamic impact conditions.

Now referring to FIG. 1, shows an exemplary embodiment of a typical running shoe having an upper portion 10, a protective outsole 12, and a shock-absorbing midsole 14. The midsole has a lattice structure as a layer covering the majority of the area of the midsole.

The lattice structure consists of an integrated network of units. Each unit has an upper member and a lower member. Both the upper member and the lower member are of a hexagonal frustum shape forming an hourglass shape unit. The lattice structure of the integrated network of units can be manufactured as a single structure or in two layers, i.e., the upper layer and the lower layer that can be bonded together. The midsole as shown in FIG. 1 narrows down from the rear end to the front of the shoe. The heel area thickness 16 is broadest, a midfoot thickness 18, a forefoot thickness 20, and a toe area thickness 22 narrowest. The lattice structure of the midsole can extend across the shoe from the inside medial to the outside lateral portion and may vary in thickness to present a conformable surface to the upper portion of the shoe. Additionally, all four portions of the midsoles can be manufactured as an integral unit. It is to be noted that it is preferable to manufacture the midsole as an integrated unit, however, portions can be manufactured separately and integrated later. Moreover, the continuous lattice structure of the interconnected hourglass shape units can be manufactured in two parts i.e., the upper layer and the lower layer which can then be bonded. The upper layer and the lower layer can be made of the same material or different materials.

The disclosed resilient lattice structure can be manufactured from TPEs (thermoplastic elastomers). TPEs are usually blocked polymers with both crystalline and amorphous segments. HYTREL® from DuPont is available in different grades, the grades 4056 and 5526 can be used for manufacturing the disclosed resilient lattice structure using injection molding, either by themselves or in combination to achieve shore D hardness of 40-55. Grades 4556, 5556, and 6356 can also be used. For the SLS (stereo laser sintering) method, powdered versions of these same polymers can be used. For the SLA (stereo laser apparatus) method, the liquefied version of these same polymers can be used. For 3D filament printing, 4056 grades available in filament form (1.75 and 3.0 diameters) can be used. The disclosed lattice structure can also be made from other suitable polymers including co-polyesters, polyurethanes, nylons of high molecular weight, copolymers of polyurethane and high molecular weight nylons, ionic polymers, Thermoplastic polyurethane, PEBAX® (Arkema) co-polymer of Nylon 12 and thermoplastic polyurethane; Co-polyester elastomer (DuPont); Ionic resin (DuPont); Toughened nylons 11, 12, (Arkema) 610, 612, ELVAMIDE® 8061 (DuPont) blended with co-polyesters (DuPont), and with any other thermoplastic elastomeric material with shore D hardness between 30 and 70.

A flexible thermoplastic rim 24 can surround the midsole area to prevent the ingress of dust, pebbles, scree, stones, or liquids from entering the lattice structure. The flexible thermoplastic rim 24 can be transparent, translucent, or opaque. Preferably, the flexible thermoplastic rim 24 can be transparent to translucent. The rim can be of a flexible transparent thermoplastic material, such as aliphatic polyurethane, acrylic, vinyl, FLEXRITE®, or other suitable polymers. Besides the rim, an additional protective layer of heat shrinkable film can be provided. The upper portion and the outsole can be manufactured using known methods and materials. For example, the upper portion can be made from synthetic fabrics and plastic stiffeners. The outsole can be made of rubber. The disclosed midsole can be cemented between the upper portion and the outsole.

Figure 2:
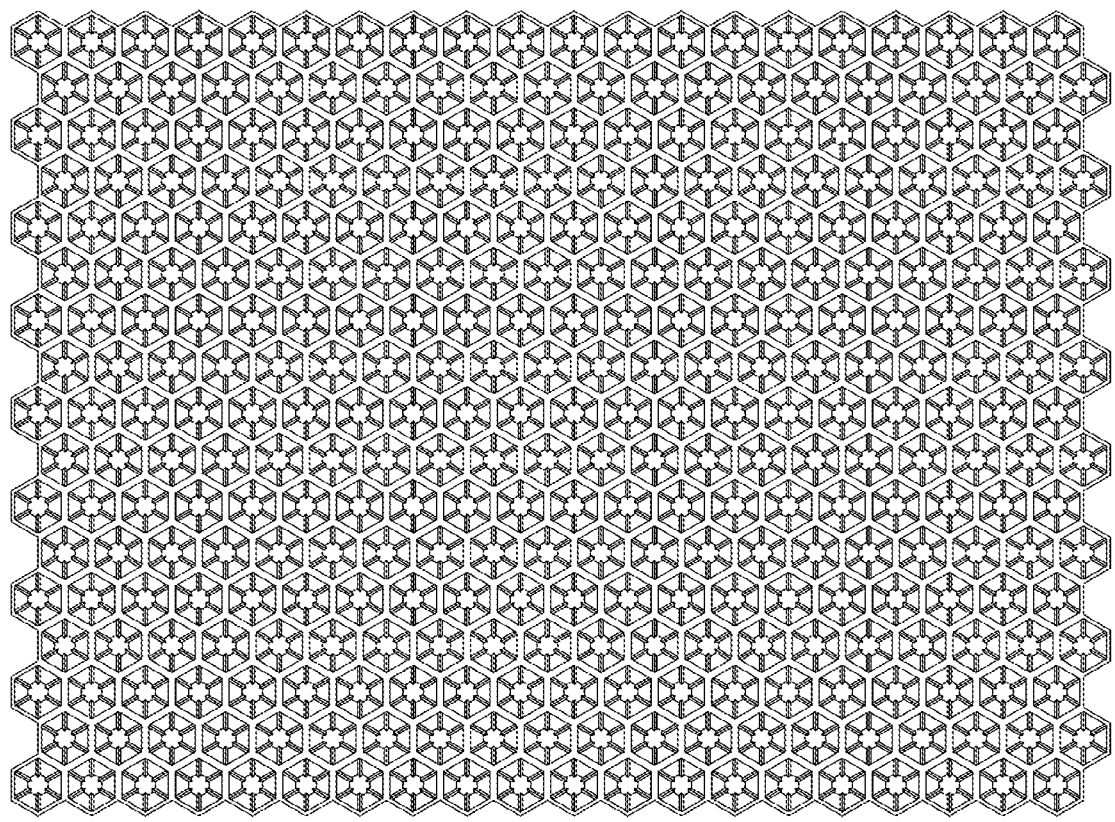
FIG. 2 shows an interconnected network of midsole, wherein each unit is integrated with six units, according to an exemplary embodiment of the present invention.
Figure 3:
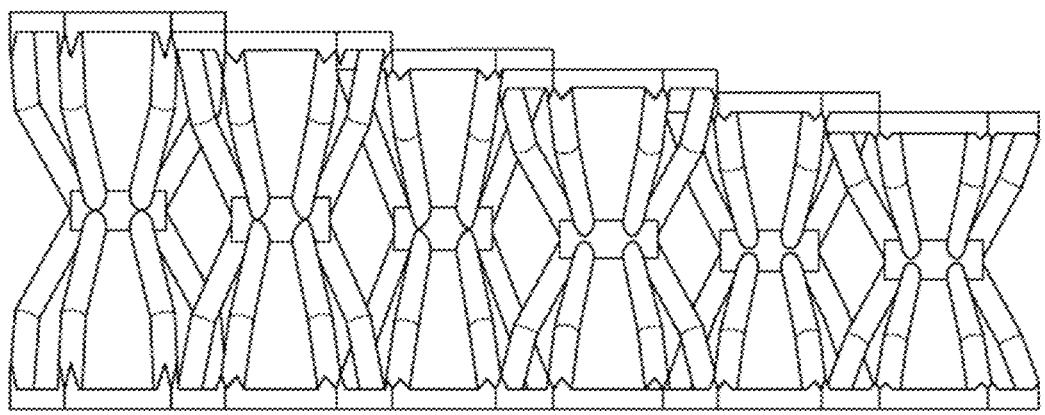
FIG. 3 is a side view of a section of lattice structure having the unit tapering in height from left to right, according to an exemplary embodiment of the present invention.

FIG. 2 shows a top view of a section of the midsole having a network of integrated hexagonal hourglass shape units. FIG. 2 shows that each unit has a top with six sides forming a hexagon. Each unit can be seen integrated with six other units. The lattice structure can be manufactured as a sheet in which the midsoles of desired shape and size can be die-cut. Referring to FIG. 3 shows the side view of a section of the lattice structure showing six integral units arranged side-by-side. The units are coupled with each other at their ends. Additionally, the lattice structure can be stabilized by a mesh integrated into the middle/neck of each unit. FIG. 3 shows the section with the units tapering down from left to right.

Figure 4:
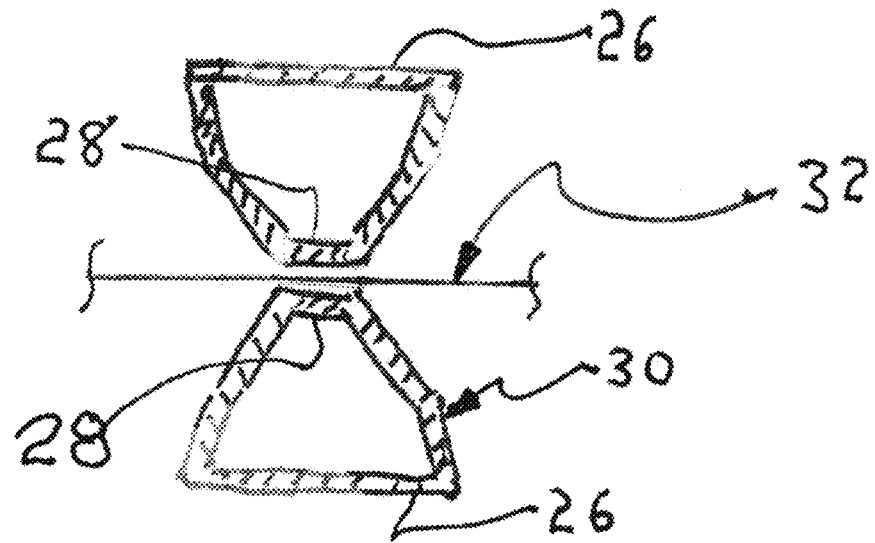
FIG. 4 is a unit of the network midsole of an hourglass shape having the upper member and the lower member, each of the upper member and the lower member of a hexagonal frustum shape, the lower member is a mirror image of the upper member according to an exemplary embodiment of the present invention.

Referring to FIG. 4 shows a sectional view of a single unit of the lattice structure. As can be seen in FIG. 4, each unit has an upper member of a hexagonal frustum shape and a lower member that is an inverted upper member forming the hourglass shape. Each of the upper member and the lower member resembles a hexagonal frustum, wherein the narrow base 28 of the frustum can be round, resulting in a tubular neck, while the top 26 and bottom 26 of the unit can be polygonal. Also shown in FIG. 4 is the mesh 32 that integrates with the neck of the unit for stabilizing the lattice structure. The mesh can be made from the same material as the unit. The sectional view in FIG. 2 shows two legs that extend from the mid-neck of the unit up to the corners of the hexagonal top. Each of the upper member and the lower member of the unit can have legs equal to the number of sides in the polygonal frustum. For example, the hexagonal frustum can have six sides and six legs that originate from the narrow base up to the broad base of the frustum. The legs are of a curved geometry and have a midpoint 30. The parts of the leg on opposite sides of the midpoint have a different angle relative to a vertical axis.

Figure 5:
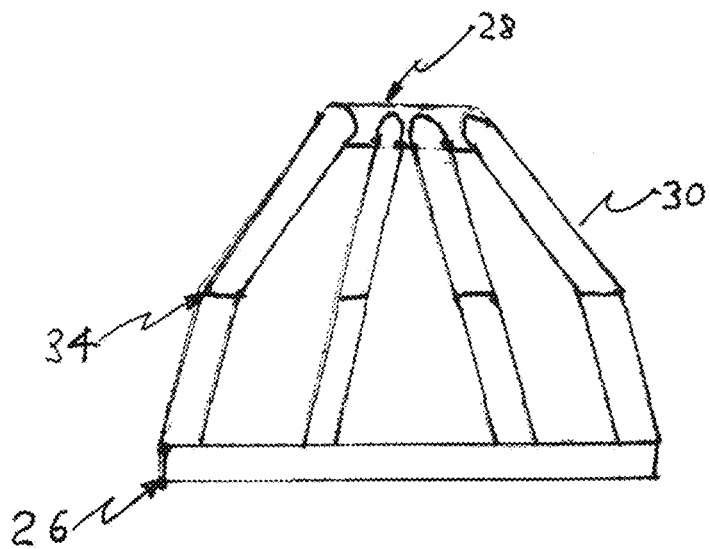
FIG. 5 is a side view of the lower member of the unit shown in FIG. 4, according to an exemplary embodiment of the present invention.

Referring to FIG. 5 shows the lower member of the unit having six legs that extend from the broad hexagonal base to the narrow top, the legs connect to the six corners of the broad hexagonal top. The legs can be made of a resilient material that allows each unit to absorb a portion of an external impact. The bases and legs of the unit can be made of the same material. The unit can have a wireframe like structure that is integral to the other units.

Figure 6:
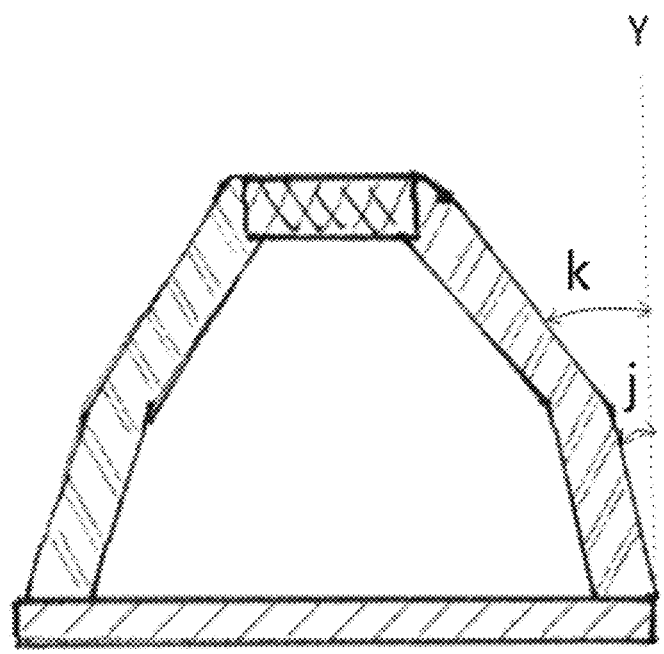
FIG. 6 is a sectional view of the lower member shown in FIG. 5, according to an exemplary embodiment of the present invention.

Referring to FIG. 6 shows the sectional view of the lower member wherein the two opposite legs are only shown for clarification. Taking a bottom hexagonal base and a vertical axis perpendicular to the bottom as the reference, each leg extends upwards from a corner of the polygonal bottom at an acute angle towards the narrow top. FIG. 6 shows the acute angle "j" relative to the vertical axis "Y". Each leg can have a mid-point having two parts, the first part is adjacent to the hexagonal bottom and the second part is adjacent to the narrow top. The first part bends inwards at an angle "j" which is preferably 5-20 degrees, more preferably 12-18 degrees, and most preferably 14-16 degrees. The second part bends further inwards at an angle "k" relative to the vertical axis. The angle k is preferably 15-34 degrees, more preferably 28-32 degrees, and most preferably 29-31 degrees.

The dimensions of the unit can be different ranging from the heel area up to the toe. Beginning at heel area 16 where the structures are the largest, the hexagonal base 26 can be of a width preferably 11-15 mm, or more preferably 10-14 mm, or most preferably 11-14 mm. As the tapered structure 14 moves forward from heel area 16 to the midfoot 18 to the forefoot 20 to the toe-off 22 areas, the structures become smaller in most dimensions as desired. This is due to the scalability (programming) of the whole structural network. The diameter of the narrow base or neck of unit 28 can be about 4-8 mm, more preferably 5-7 mm, and most preferably 5.5-6.5 mm. The heights of the upper member and the lower member can be in the range 7-13 mm, or more preferably 8-12 mm, or most preferably 9-11 mm. The height of the unit and thus the lattice structure can be the combined heights of the lower member and the upper member. The height of the first part of the leg shown in FIG. 6 can be about 2-6 mm, more preferably 3-5 mm, or most preferably 4 mm. This dimension also shrinks moving from the heel area to the toe-off position. The thickness of the hexagonal base 26 can be about 0.5-2.0 mm, or more preferably 0.75-1.5 mm, or most preferably 0.85-1.4 mm. The thickness of the narrow base or narrow top 28 can be about 1.0-2.0 mm, or more preferably 1.25-1.75 mm, or most preferably 1.35-1.65 mm. The diameter(s) of the legs 30 can be about 0.8-1.9 mm, or more preferably 0.9-1.8 mm, or most preferably 1.1-1.7 mm. The thickness of the legs can also decrease moving from the heel area up to the toe. Additionally, the thickness of the leg can gradually decrease from the hexagonal base to the narrow base of the upper or lower member. However, the minimum diameter of the leg can be about 0.75 mm and the maximum diameter can be about 1.9 mm.

Also, the legs 30 may have varying heights across the midsole as they can be tapered in a contoured fashion in order to fit the bottom of an upper portion 10 of the shoe and also to incorporate any motion control features to address pronation or supination issues. Additionally, the thickness of the legs may be tailored to accommodate variances in the weight of the athletes.

The design of a single structure is dictated by the element 30 diameters chosen from the static and dynamic force versus penetration tests of previous lab data as well as the fact that the stiffness is proportional to the cubed thickness of the elements 30. Once the proper diameter(s) of each of the opposing structural elements 30 meet at the central circular member 28, the circumference of this member will be 12× the average of all of the element diameters 30 as they all need to attach at this area. Next, the angles j and k are applied from the circular member in order to define the sizes of both the top and bottom hexagonal base members 26.

Figure 7:
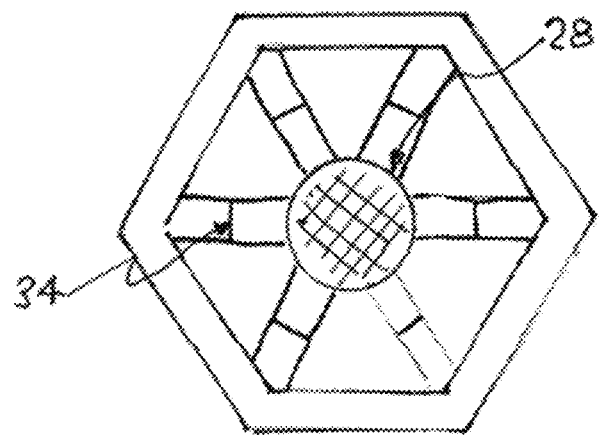
FIG. 7 is a top view of the lower member, according to an exemplary embodiment of the present invention.

FIG. 7 shows the top view of the lower member shown in FIG. 4, wherein the crosshatch on the base shows the attachment point of the upper member. Six legs can be seen extending from the base towards the six corners of the hexagonal top.

Figure 8:
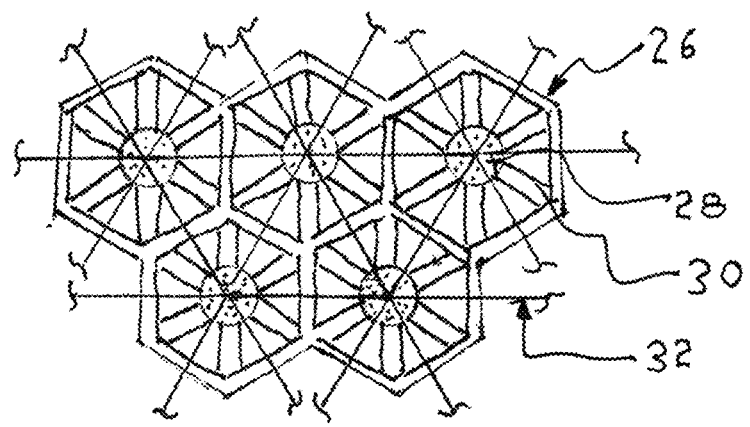
FIG. 8 is a layer of interconnected lower members, each unit is integrated with six units, according to an exemplary embodiment of the present invention.

FIG. 8 shows the integration of each unit into other units forming the lattice structure. FIG. 8 shows the lower member of the unit integrated side-by-side in an upstanding position with other units. The sides of the hexagonal bottom of the lower unit can be seen integrated, wherein six sides are integrated with the six units. The spatially adjacent sides of the upper member and the lower member are integrated with the spatially adjacent top and bottom sides of another unit. Another unit can in turn be integrated with the other five units to form the continuous integrated network. FIG. 8 also shows the mesh 32 connected to the mid of each unit further stabilizing the lattice structure.

Figure 9:
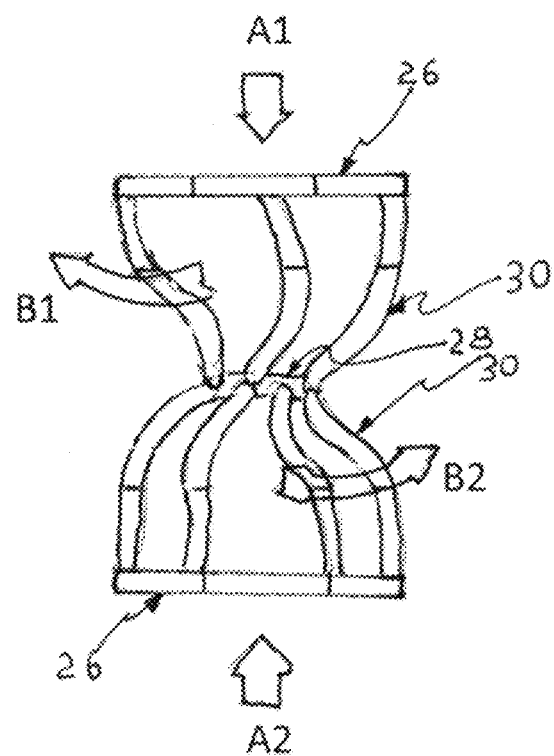
FIG. 9 is a schematic side view of a unit showing the effect of external force on the top and the bottom of the unit, according to an exemplary embodiment of the present invention.

Referring to FIG. 9 which shows the unit under external compression forces shown by arrows A1 and A2. Forces A1 and A2 shown by arrows show the impact on the midsole when the feet lands on the ground. The midsole is compressed from both ends wherein the legs of the upper member and the lower member are staggered in a predefined pattern to absorb the impact. FIG. 9 shows the side view of the unit under compression from an athlete's weight A1 at ground level and the ground reaction force (GRF) A2. The unit has the upper member and the lower member. The upper member can be made of the same or different material as the lower member. The lattice structure can be manufactured in two layers, i.e., the upper layer and the lower layer. The upper layer has a network of upper members of the unit while the lower layer can have a network of lower members. The upper layer can be bonded to the lower layer. The two layers can be bonded at narrow bases of the hexagonal frustums using known processes, such as Hot Plate Bonding whereby the metal plate is Teflon coated on both sides or Teflon fabric is used on both sides of the plate to prevent sticking of the molten plastic. Another method, adhesive bonding can also be used whereby adhesion promoter CHEMLOK® AP-134 (Lord Chemical) is applied to both pieces of plastic at the central joining point and adhesive TYCEL® 7000 with curing agent TYCEL® 7203 (Lord Chemical) or industry-standard polyurethane cement are used to complete the bonding process.

In one embodiment, the upper member and the lower member can be snap-fit to form the unit. The narrow basses can have a plug and hole for snap-fitting the upper member to the lower member.

Referring again to FIG. 9, the unit has the hexagonal frustum shaped upper member and the hexagonal frustum shaped lower member. The upper member has a hexagonal broad top and a narrow base. Similarly, the lower member has a broad hexagonal bottom and a narrow top. The upper member has six legs that extend from the corners of the hexagonal broad top to the narrow base and six legs that extend from the broad hexagonal bottom to the narrow top. The legs can be of the same diameter or gradually tapers from the polygonal top or bottom towards the middle of the unit. The upper legs are arranged offset relative to the lower legs. Additionally, the upper legs in one unit are arranged offset relative to the upper legs of the adjacent unit.

Figure 10:
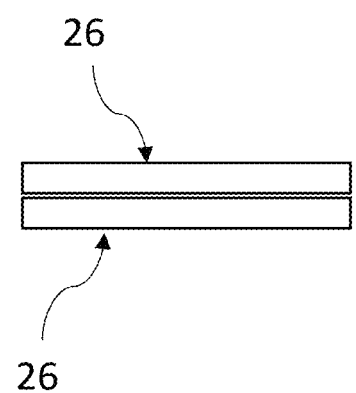
FIG. 10 is a side view of the unit shown in FIG. 8 in a collapsed form, according to an exemplary embodiment of the present invention.
Figure 11:
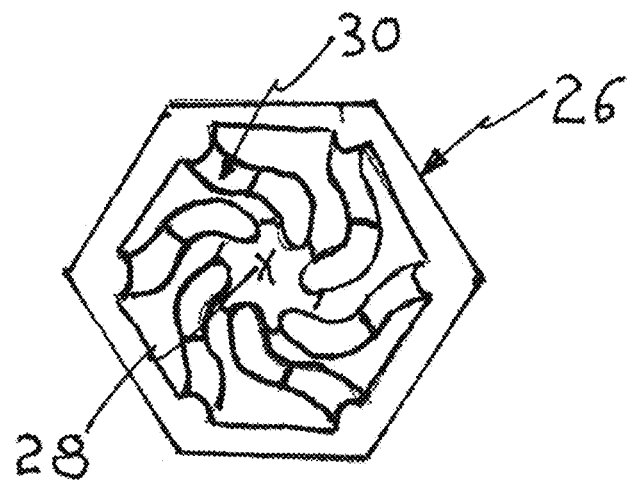
FIG. 11 is a top view of the unit shown in FIG. 10, showing the legs helically twisted, according to an exemplary embodiment of the present invention.

Under the external compression force, the upper legs and the lower legs bulge outwards slightly up to a predetermined force range, which absorbs a portion of the external force. If the external force exceeds the predetermined force range, the legs helically twist to absorb the external force. The upper legs twist in a direction opposite the lower legs. This allows the unit to quickly regain its shape after the external force is removed. The legs can be twisted until the unit collapses i.e., the hexagonal top of the upper leg and the hexagonal bottom of the lower leg are juxtaposing relative to each other. The predetermined force range and the maximum external force that can be absorbed by the disclosed unit depends upon the material and diameter of the legs. The directional arrows B1 and B2 show the direction of movement of the upper legs and the lower legs. FIG. 10 shows the unit shown in FIG. 9 collapsed. The height of the unit in a fully compressed form can be similar to the combined thickness of the hexagonal tops of the upper member and the lower member. FIG. 11 shows the top view of the upper member showing the upper legs helically twisted. The lower legs are omitted in FIG. 11 for clarity.

Figure 12A:
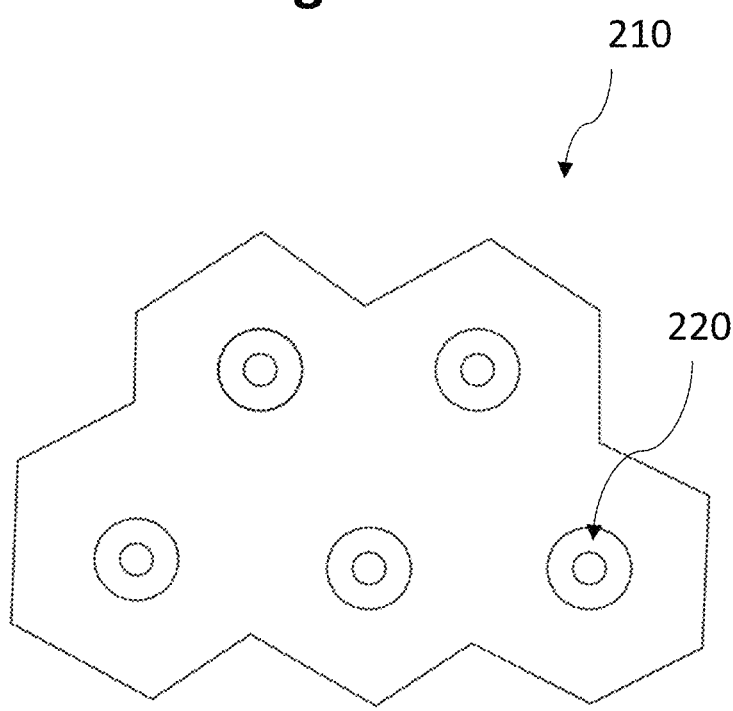
FIG. 12A shows a gel matrix that can encapsulate the lattice structure, according to an exemplary embodiment of the present invention.
Figure 12B:
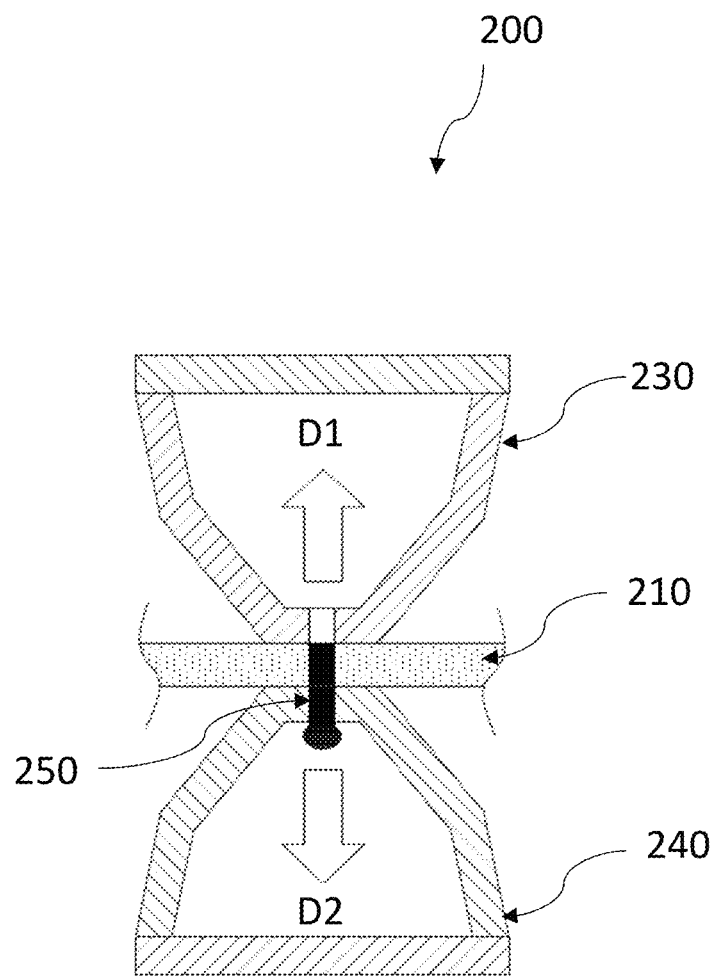
FIG. 12B shows the gel matrix sandwiched between the upper member and the lower member, according to an exemplary embodiment of the present invention.

FIG. 12A shows a gel matrix 210 that can also be incorporated into the midsole for enhanced comfort and shock absorption. The lattice structure can be encapsulated into the gel matrix. In case, the lattice structure is manufactured as two separate layers, the gel matrix can fit between the two layers, wherein the gel matrix may have apertures 220 for the narrow base members to bond. FIG. 12B shows the gel matrix sandwiched between the upper member and the lower member. The upper member 230 has a plug while the lower member can have an aperture. The plug can be secured by snap fit mechanism into the aperture of the lower member. The plug can be inserted through aperture 220 of the gel matrix. The length of the plug can be such as to accommodate the gel matrix thickness. Arrows D1 and D2 show the movement of the upper member relative to the lower member under external forces. Under compression forces, the upper member moves towards the lower member suppressing the gel matrix. This absorbs a portion of the impact while the disclosed unit of the lattice structure can absorb rest of the impact.

Figure 13:
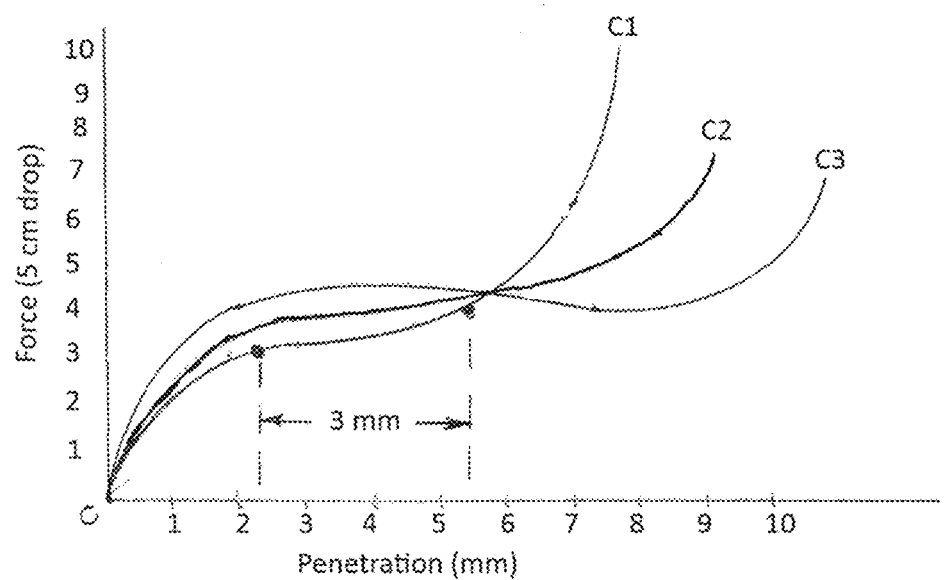
FIG. 13 is a line graph showing the typical Force/Penetration History plot of a standard industry 5 cm Drop Test of a 20-newton weight simulating the ground reaction force experienced by a runner. The disclosed midsole is compared with two known shock absorbing midsoles, wherein C1 is Foam, C2 is FOAMPOSITE, and C3 is the sample of the disclosed lattice structure, according to an exemplary embodiment of the present invention.

FIG. 13 is a line graph showing a Force/Penetration history of a typical industry drop test simulating a runner wearing running shoes onto a Kistler force plate which measures the ground reaction force (GRF) incurred at the heel area of the shoe. Tests were performed to compare the disclosed midsole with the industry standards FOAMS and FOAMPOSITE. The data line [1] shows the outcome of the test using the FOAM, Line [2] shows for the FOAMPOSITE, while the data line [3] shows the result for the disclosed midsole. The foams used in almost 100% of all shoes underperformed as only 3 mm of the 10 mm midsole thickness test sample reduce the vertical force. The FOAMPOSITE, a composite of foam with a thin 10 mm plastic structure incorporated within, is better than foam alone as approximately 5 mm of the 10 mm sample midsole thickness reduces the vertical force. As can be seen in the graph that the disclosed midsole outperforms which reduces the vertical force in that 7.5 mm of the 10 mm sample midsole thickness is reducing the force as seen in the graph.

Figure 14:
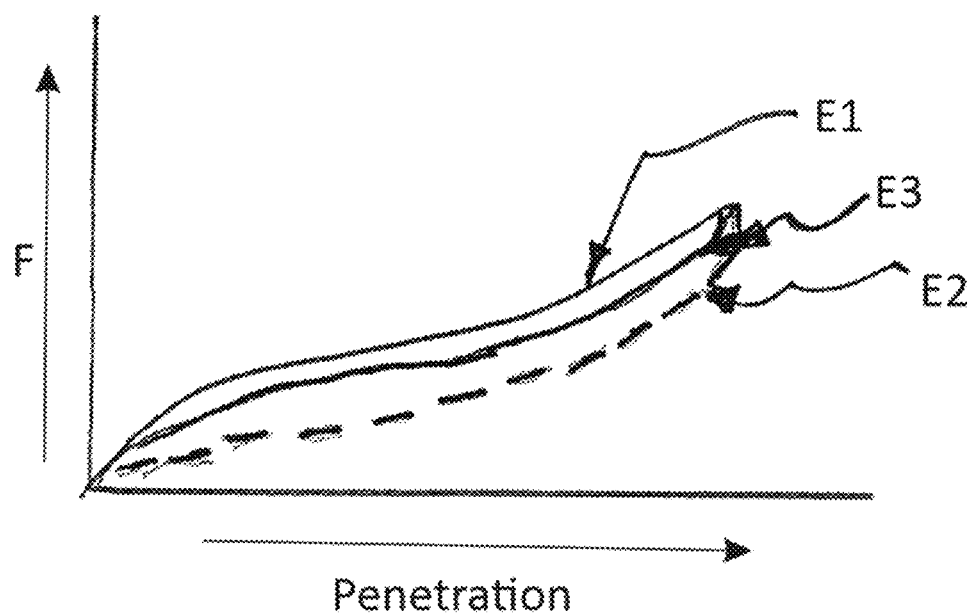
FIG. 14 is a plot of the test as in FIG. 13 including the typical shape of a hysteresis loop of energy returned to the runner after the shock has been absorbed.

FIG. 14 is a graph showing the typical hysteresis loop of the same drop test in FIG. 11 with the upper curve E1 being a typical impact penetration plot and the lower portion of the loop E2 being the return of the weight back to its starting point. E3 is shown as a wider loop than E2 implying that more energy is lost resulting in a poorer coefficient of restitution for the material. The thinner loop is the most preferred.

The design of a single structure is dictated by the element 30's diameter chosen from the static and dynamic forces versus penetration tests of previous lab data as well as the fact that the stiffness is proportional to the cubed thickness of the elements 30. Once the proper diameter(s) of each of the opposing structural elements 30 meet at the central circular member 28, the circumference of this member will be 12× the average of all of the element diameters 30 as they all need to attach at this area. Next, the angles j and k are applied from the circular member in order to define the sizes of both the top and bottom hexagonal base members 26.

Figure 15:
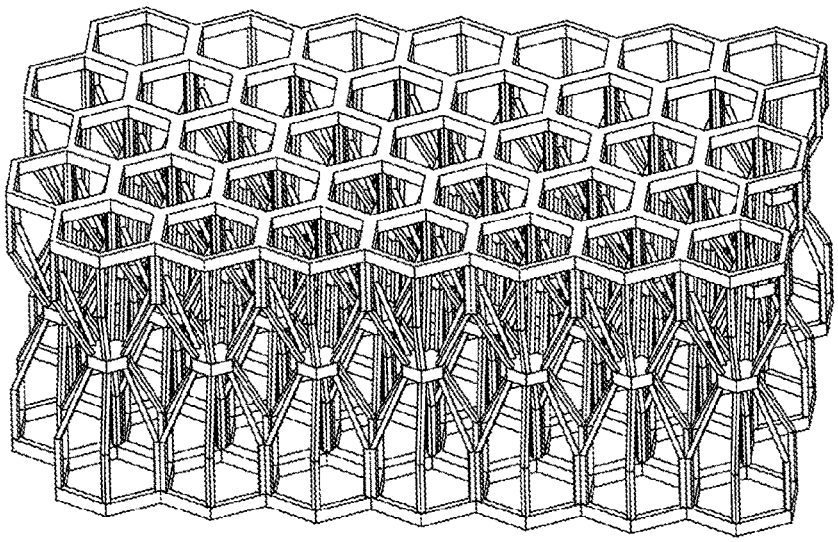
FIG. 15 shows the lattice structure having the integral upper layer and the lower layer, according to an exemplary embodiment of the present invention.
Figure 16:
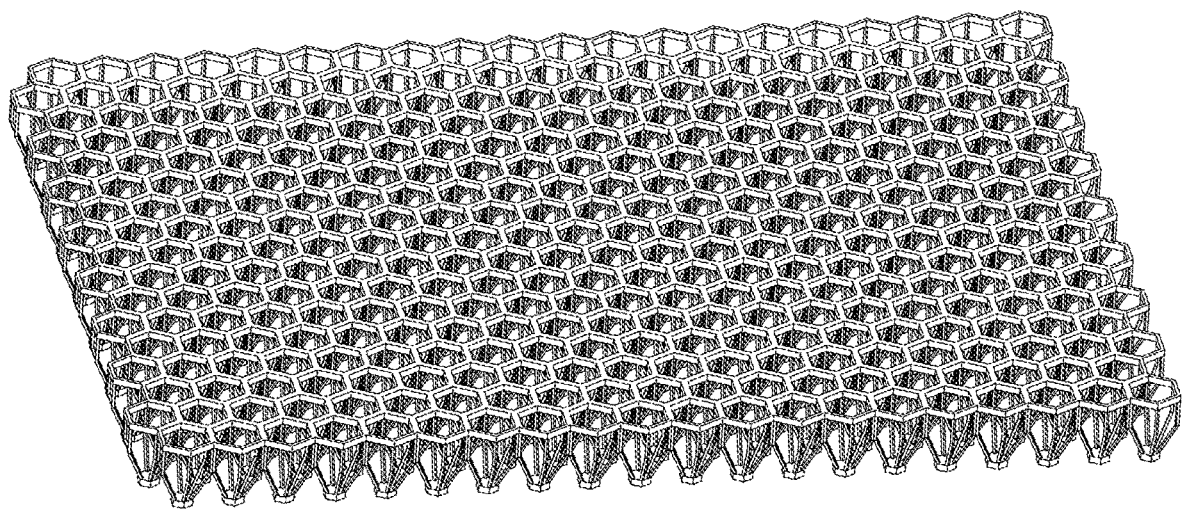
FIG. 16 shows the upper layer of the lattice structure that can be bonded with the lower layer, according to an exemplary embodiment of the present invention.

Disclosed footwear including the above described midsole has several advantages including cushioning, energy return, adjustably tunable softness, adjustable springiness, adjustable stability, and improved fit. As an example, the heel height can be adjusted for runners wanting to convert from typically raised heel footwear to the "zero drop" (no difference in heel/forefoot midsole thickness) styles. The disclosed footwear can be used in sports such as basketball, tennis, and racquetball which require extreme motion in the transverse plane, i.e., lateral and medial directions. In these cases, the midsoles must be more stable in multiple directions as compared to the running shoes as an example. The only way to provide benefits to the participants in these sports is to provide midsoles that employ the maximum possible range for which benefits can be "packaged". For example, the critical dimensions and angles of each structure have been chosen so that, upon initial compression, the elements do not bow outward and contact each other, thus inhibiting the allowable range of motions of each individual and adjacent structure. The thickness of the midsole can be varied based on the intended usage. The lattice structure of the midsole is scalable in a thickness range from 6-24 mm along and across the entire length and breadth of the midsole of the athletic shoe, 10 mm minimum thickness is preferred. 14 mm minimum is more preferred, 17 mm minimum is most preferred. The disclosed lattice structure can be sandwiched between two layers of load distribution plates. FIG. 15 shows an exemplary embodiment of the lattice structure having the integrated upper layer and a lower layer. FIG. 16 shows only the upper layer that can be bonded to the similar lower layer to form the lattice structure.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A midsole for a footwear, the midsole comprising a lattice structure of an area proportional to an area of the midsole, the lattice structure comprising:
    a plurality of units, each unit having an upper member and a lower member, the upper member and the lower member are of a polygonal frustum geometry forming an hourglass shape geometry, the plurality of units are integrated side-by-side in an upstanding position,
    the upper member comprises:
        a broad hexagonal top,
        a narrow base parallel to the broad hexagonal top, and
        six legs that extend from a periphery of the narrow base to corners of the broad hexagonal top,
    the lower member comprises:
        a broad hexagonal bottom,
        a narrow top that is parallel to the broad hexagonal bottom, and
        six lower legs that extend from a periphery of the narrow top to corners of the broad hexagonal bottom,
    wherein,
        the narrow base of the upper member and the narrow top of the lower member are bonded to form a neck of the unit,
        the six upper legs and the six lower legs are arranged offset to each other,
        the six upper legs and the six lower legs are configured to bulge outwards under an external compressive force up to a predetermined range of the force and above the predetermined range of the force, the six upper legs and the six lower legs helically twist, the six upper legs twist in a clockwise direction and the six lower legs twist in an anti-clockwise direction.

2. The midsole according to claim 1, wherein each leg of the six lower legs has a mid-point dividing the leg into two parts, the part adjacent the broad hexagonal bottom bends inwards at an angle of 5-20 degrees relative to a vertical axis perpendicular to the broad hexagonal bottom, the second part adjacent the narrow top bends inwards at an angle between 15-34 degrees relative to the vertical axis.

3. The midsole according to claim 1, wherein each leg is of a diameter ranging from about 0.75 mm to 1.9 mm.

4. The midsole according to claim 1, wherein the lattice structure is broadest in a heel area and gradually tapers towards a toe of the footwear.

5. The midsole according to claim 1, wherein the midsole further comprises a shock-absorbing gel matrix encapsulating the lattice structure.

6. The midsole according to claim 5, wherein the upper member and the lower member are bonded through a snap fit mechanism.

7. The midsole according to claim 6, wherein the gel matrix comprises apertures of a dimension to receive the narrow base of the upper member and the narrow top of the lower member.

8. The midsole according to claim 1, wherein the midsole further comprises an outer rim surrounding the lattice structure for preventing ingress of dirt and grit.

9. The midsole according to claim 1, wherein the midsole further comprises a pair of load distribution plates sandwiching the lattice structure.

10. The midsole structure according to claim 1, wherein each unit is integral with six adjacent units to form the lattice structure, wherein a side of the broad polygonal top of one unit is integral with a side of a broad polygonal top of an adjacent unit, wherein a side of the broad polygonal bottom of the one unit is integral with a side of a broad polygonal bottom of the adjacent unit.

11. A footwear comprising an upper portion, an outer sole and a midsole, the midsole sandwiched between the upper portion and the outer sole, the midsole comprising a lattice structure, the lattice structure comprising:
    a plurality of units, each unit having an upper member and a lower member, the upper member and the lower member are of a polygonal frustum geometry forming an hourglass shape geometry, the plurality of units are integrated side-by-side in an upstanding position, the upper member comprises:
- a broad hexagonal top,
- a narrow base parallel to the broad hexagonal top, and
- six legs that extend from a periphery of the narrow base to corners of the broad hexagonal top, the lower member comprises:
- a broad hexagonal bottom,
- a narrow top that is parallel to the broad hexagonal bottom, and
- six lower legs that extend from a periphery of the narrow top to corners of the broad hexagonal bottom, wherein, the narrow base of the upper member and the narrow top of the lower member are bonded to form a neck of the unit, the six upper legs and the six lower legs are arranged offset to each other, the six upper legs and the six lower legs are configured to bulge outwards under an external compressive force up to a predetermined range of the force and above the predetermined range of the force, the six upper legs and the six lower legs helically twist, the six upper legs twist in a clockwise direction and the six lower legs twist in an anti-clockwise direction.

\* \* \* \* \*